(12) United States Patent  (10) Patent No.: US 8,448,578 B2
Golder  (45) Date of Patent: May 28, 2013

(54) GUIDE ROLLER ARRANGEMENT FOR CRANES

(75) Inventor: Markus Golder, Ettlingen (DE)

(73) Assignee: Konecranes PLC, Hyvinkaa (FI)

( * ) Notice: Subject to any disclaimer, the term of this patent is extended or adjusted under 35 U.S.C. 154(b) by 410 days.

(21) Appl. No.: 12/742,592

(22) PCT Filed: Nov. 14, 2008

(86) PCT No.: PCT/EP2008/009648
§ 371 (c)(1),
(2), (4) Date: Jul. 13, 2010

(87) PCT Pub. No.: WO2009/062730
PCT Pub. Date: May 22, 2009

(65) Prior Publication Data
US 2010/0282123 A1    Nov. 11, 2010

(30) Foreign Application Priority Data

Nov. 14, 2007 (DE) .......................... 10 2007 054693

(51) Int. Cl.
*B66C 9/16* (2006.01)
*B66C 19/00* (2006.01)
(52) U.S. Cl.
USPC .......................... 104/247; 104/246; 105/163.1
(58) Field of Classification Search
USPC .................. 104/242, 245, 246, 247, 119, 93, 104/94, 95, 118; 105/148, 150, 153, 154, 105/155, 163.1
See application file for complete search history.

(56) References Cited

U.S. PATENT DOCUMENTS

| 1,424,069 | A | * | 7/1922 | Blackmar | .................... 81/124.3 |
| 1,618,046 | A | * | 2/1927 | Barb | ............................. 81/125.1 |
| 2,912,714 | A | * | 11/1959 | Rich | ................................ 16/100 |
| 3,606,029 | A | | 9/1971 | Verlinde | |
| 4,805,537 | A | * | 2/1989 | Desroches | .................... 104/246 |

FOREIGN PATENT DOCUMENTS

| AT | 284396 B | 9/1970 |
| DE | 1245070 B | 7/1967 |
| DE | 2409294 A1 | 9/1975 |
| DE | 4036168 A1 | 5/1992 |
| EP | 0626336 A1 | 11/1994 |
| EP | 0656313 A1 | 6/1995 |
| GB | 2066763 A | 7/1981 |

* cited by examiner

*Primary Examiner* — Mark Le
(74) *Attorney, Agent, or Firm* — Leydig, Voit & Mayer, Ltd.

(57) ABSTRACT

A guide-roller arrangement for gantry cranes (1) has two rotatably mounted axial carriers (21) on which the guide rollers are seated. The guide rollers (11, 12) are mounted on journals which are arranged in the carrier plate (15) in a manner eccentric to the axis of rotation (41) of the axial carrier (21). The selected eccentric position of the journal can be fixed in a formfitting manner with the aid of toothing formations (29, 36) on the axial carrier and on the carrier plate.

19 Claims, 6 Drawing Sheets

GUIDE ROLLER ARRANGEMENT FOR CRANES

CROSS-REFERENCE TO RELATED APPLICATIONS

This patent application is the national phase of PCT/EP2008/009648, filed Nov. 14, 2008, which claims the benefit of German Patent Application No. 102007054693.0, filed Nov. 14, 2007.

FIELD OF THE INVENTION

The present invention relates generally to gantry cranes, and more particularly, to an improved guide roller arrangement for guiding movement of the carrier head of the gantry crane along transport rails.

BACKGROUND OF THE INVENTION

Gantry cranes run on parallel crane rails that are installed along the ends of the crane bridge. The crane bridge runs between two mutually parallel crane head carriers on which the crane wheels are rotatably seated. A distinction is made between the crane wheels, which absorb the load and are therefore the actual crane wheels, and guide rollers, which hold the crane head carriers on the rail. Out of concern for wear on the rail head, the lateral guidance should not be performed via the crane wheel, i.e., its wheel flanges should not come into contact with the crane head. That would result in a sliding friction that would cause the wheel flange or the rail head to wear prematurely. However, the guide rollers avoid such sliding friction.

For the guide rollers to be able to perform their function, they must be oriented with precision. The adjusted position of the guide rollers should ultimately be assured by positive engagement.

The problem to which the present invention is directed is to provide a guide roller arrangement that enables positively engaged fixation of a correct adjustment position of the guide rollers.

OBJECTS AND SUMMARY OF THE INVENTION

The guide roller arrangement of the present invention has a carrier plate that has a receiving opening or hole and a fixation hole. The fixation hole is disposed laterally alongside the receiving hole and axially parallel thereto. The guide roller is seated on an axle carrier that has outside toothing adjacent the guide roller. The outside toothing runs along a circle, whose axis is laterally offset from and parallel to the axis of rotation of the guide roller. In this manner, a type of eccentric displacement can be achieved.

The positively engaged fixation is accomplished with the aid of an annular securing plate. The securing plate is furnished with inside toothing that fits over the outside toothing of the axle carrier with little play. The securing plate further contains a fixation opening for receiving a bolt that runs into the fixation opening of the carrier plate to fix the securing plate on the carrier plate. The engagement between the outside toothing of the axle carrier and the inside toothing of the securing plate forms a positive connection, similar to the type of fixation of the securing plate to the carrier plate. An eccentric position of the axle journal on which the guide roller is seated with respect to the receiving hole through which the axial carrier leads is thus positively secured once it has been adjusted and can no longer shift during operation.

In order to obtain the desired low-play engagement, the root circle diameter of the inside toothing corresponds to the tip circle diameter of the outside toothing on the axle carrier. The root circle diameter of the inside toothing is understood for present purposes to mean the imaginary circle on which lie the peaks of the teeth gaps between two adjoining teeth projecting inwards in the radial direction. The teeth or teeth gaps are preferably vertex areas of a corresponding regular polygon.

A still finer gradation of the adjustment can be achieved if the carrier plate or the securing plate has at least two fixation openings that are offset in the circumferential direction by an angle equal to a multiple of the distance between two adjoining teeth of the inside toothing plus half the angular distance.

Another approach for achieving a very fine adjustment results from a similar design, wherein, however, the outside toothing of the axle carrier does not engage directly with the inside toothing of the securing plate. The two sets of teeth form an annular gap within which a ring is deposed that has teeth on both the inside and the outside. The outside toothing of the ring matches, for example, the inside toothing of the securing plate, while the inside teeth on the ring are an integer multiple of the outside teeth on the axle carrier. If the number of inside teeth on the ring and the number of outside teeth are also relatively prime, it is possible to achieve a type of vernier adjustment that allows a very fine adjustment. Thereby the adjustment of eccentricity in very fine increments becomes possible.

For the sake of easier understanding, the above brief description assumes that the inside toothing is formed on a separate securing ring. This construction has technical advantages. It is possible, however, to construct the inside toothing directly in the receiving opening in which the axle journal is seated.

It is possible to achieve a particularly good adjustability if two receiving openings are provided on the carrier plate, one of which is arranged on either side of the railhead. Thereby the guide rollers can be adjusted on both sides.

If a separate securing plate is used on which the inside toothing is formed, the receiving opening in the carrier plate can be circular, whereby it is possible to hold the axle carrier in the vicinity of the guide roller with a particularly small radial play. If toothing is used, this is somewhat more difficult and moreover, large area forces may arise.

The fixation opening for holding the securing plate can be a threaded hole, which simplifies assembly. A particularly simple fixation of the carrier plate to the crane head carrier is achieved if the carrier plate is angled and in this manner simultaneously forms a mounting surface for the crane head carrier.

The axle carrier can have an axle journal on which the drive roller is borne. The bearing can be accomplished with rolling-contact elements which allow the guide rollers to run in a particularly free manner.

Easy manufacturing of the axle carrier is achieved if it has toothing over its entire length. If a securing plate is used, the toothing can be cut into a cylindrical area.

The toothing on the axle carrier can be formed by the vertices of a regular polygon, for example, a hexagon or octagon. The inside toothing is complementary thereto and is designed such that arbitrary insertion combinations are possible.

The axial offset between the axis of the guide roller and the axis of the circle along which the toothing on the axle carrier lies is approximately 3 mm to 25 mm.

The number of teeth of the inside toothing is greater than the number of teeth in the outside toothing by a certain factor, preferably lying between 4 and 8. In that way one still achieves sufficiently large teeth to transfer a large amount of torque and to be more easily manufactured.

If the inside toothing is formed on a securing plate, then the latter can have at least two fixation openings. There is an angular offset between the two fixation openings, with this offset being an integer multiple of the angle offset between two adjacent teeth of the inside toothing plus one half of a pitch angle. In this manner, an adjustment can be achieved that is twice as fine as the pitch of the inside toothing.

If a spacer plate is inserted between the securing plate and the carrier plate, it is possible to use longer fixation bolts, which is beneficial to the reliability of the threaded connection.

The axle carrier can contain a coaxial threaded hole, by means of which it can be mounted via a mounting plate on top of the securing plate or the spacer plate.

Other objects and advantages of the invention will become apparent upon reading the following detailed description and upon reference to the drawings, in which:

Figure 1:
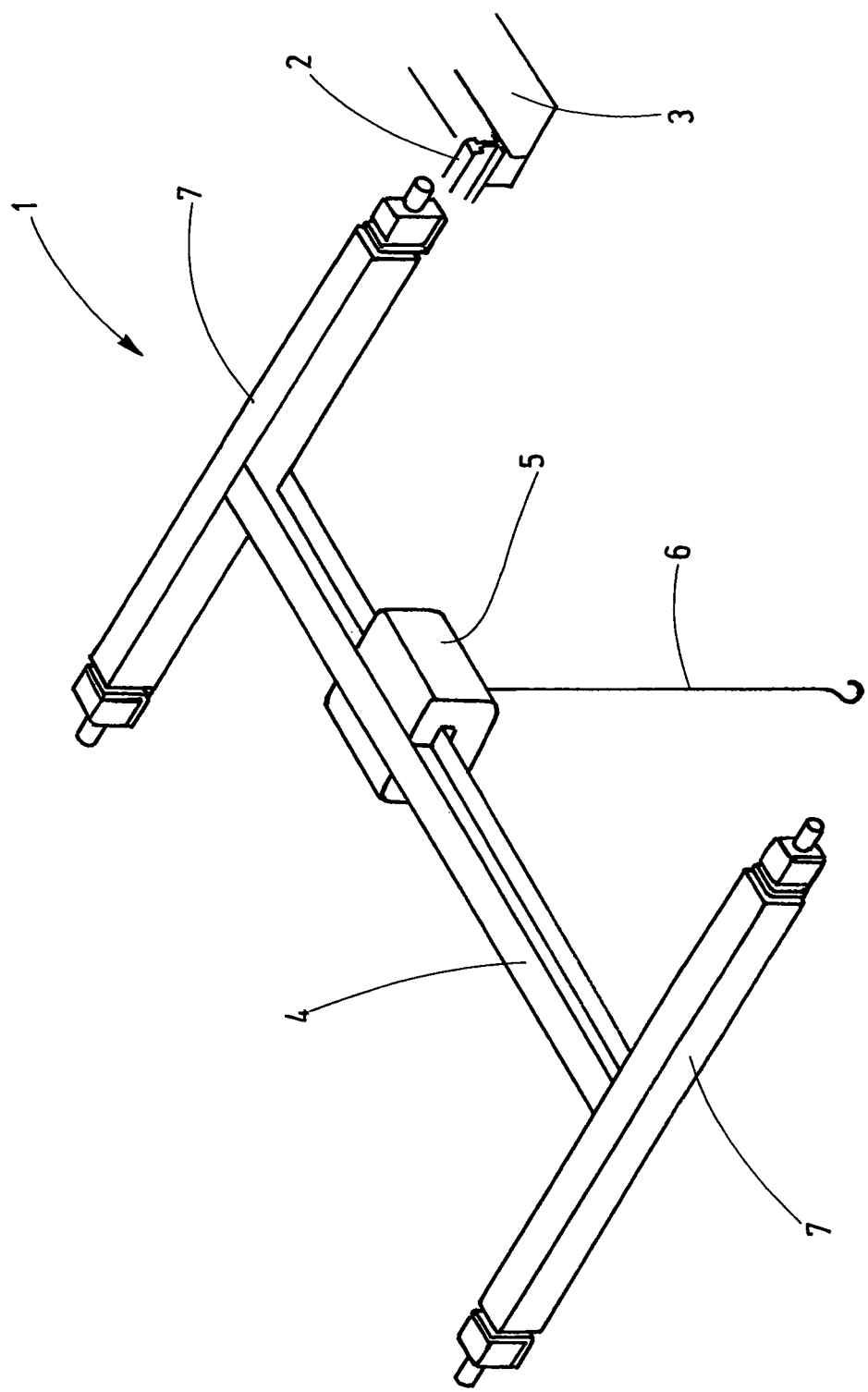
FIG. 1 is a perspective of an illustrative gantry crane having guide roller arrangements in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

It also will be appreciated by one skilled in the art that the following description is set forth for easier understanding. A skilled person can deduce additional details, not described, from the figures, which in that respect supplement the description of the figures. It will be apparent that a number of variations are possible.

The figures furthermore are not necessarily true to scale. Certain areas may be shown disproportionately large in order to illustrate details. In addition, the drawings in certain respects are simplified for ease of understanding. The terms "upper" and "lower" relate to the normal installation position or the terminology for gantry cranes.

DESCRIPTION OF THE PREFERRED EMBODIMENTS

Referring more particularly to FIG. 1 of the drawings, there is shown an illustrative gantry crane 1 designed to travel along two crane track rails 2, one of which is shown. The crane track rails 2 are mounted parallel to one another, such as on trusses 3 of a building. The gantry crane 1 has a straight crane bridge 4 that is formed, for example, by a double T-beam. A crab 5 with lifting gear contained therein, from which a cable is suspended as a carrying means 6, travels along the crane bridge 4.

The ends of the crane bridge 4 are connected to two crane head carriers 7 provided at their ends with running rollers 10 and guide rollers 11, 12 (FIG. 2), with the aid of which the gantry crane 1 travels and is guided, respectively, on the crane track rails 2.

Figure 2:
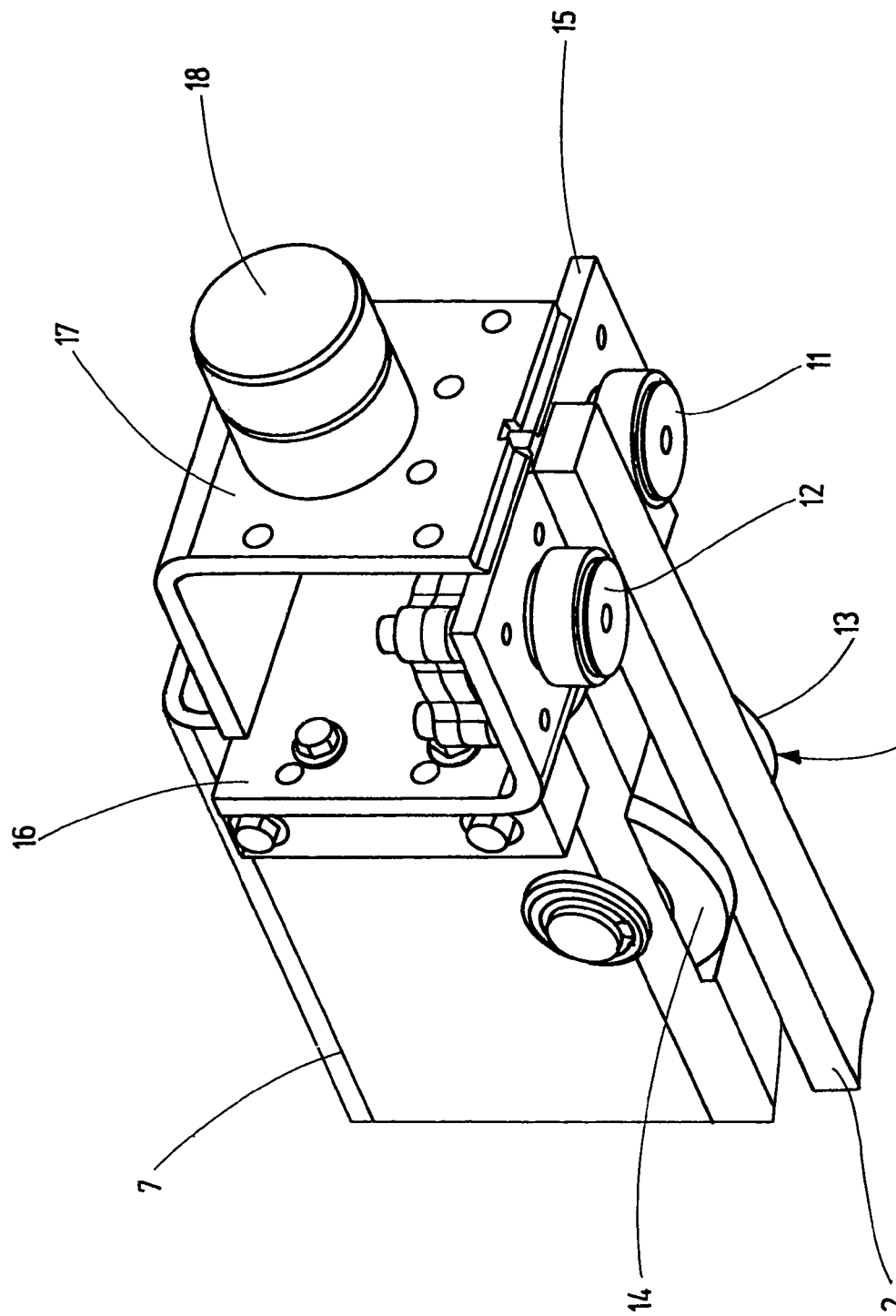
FIG. 2 is a perspective of a carrier head of the gantry crane with guide rollers operatively disposed on opposite sides of the crane track rail.

FIG. 2 shows one of the ends of a crane head carrier 7 in a perspective view from below on the crane track rail 2. The running roller 10 is rotatably seated in the tubular crane head carrier 7 and projects a distance from the underside of the crane head carrier 7. The running roller 10 has two lateral wheel flanges 13,14, which, however, have only a safety function and are not themselves intended to guide the gantry crane 1 on the crane track rail 1. The two guide rollers 11, 12, which are adjustably retained on a carrier plate 15, are present for lateral guidance.

The carrier plate 15 has an angled flange 16 fixed on an end face of the crane head carrier 7. An additional angled retaining plate 17 which is welded, for example, to the carrier plate 15 or the flange plate 16, supports a safety bumper 18. The arrangement as depicted in FIG. 2 is located at each end of the two crane head carriers 7.

Figure 3:
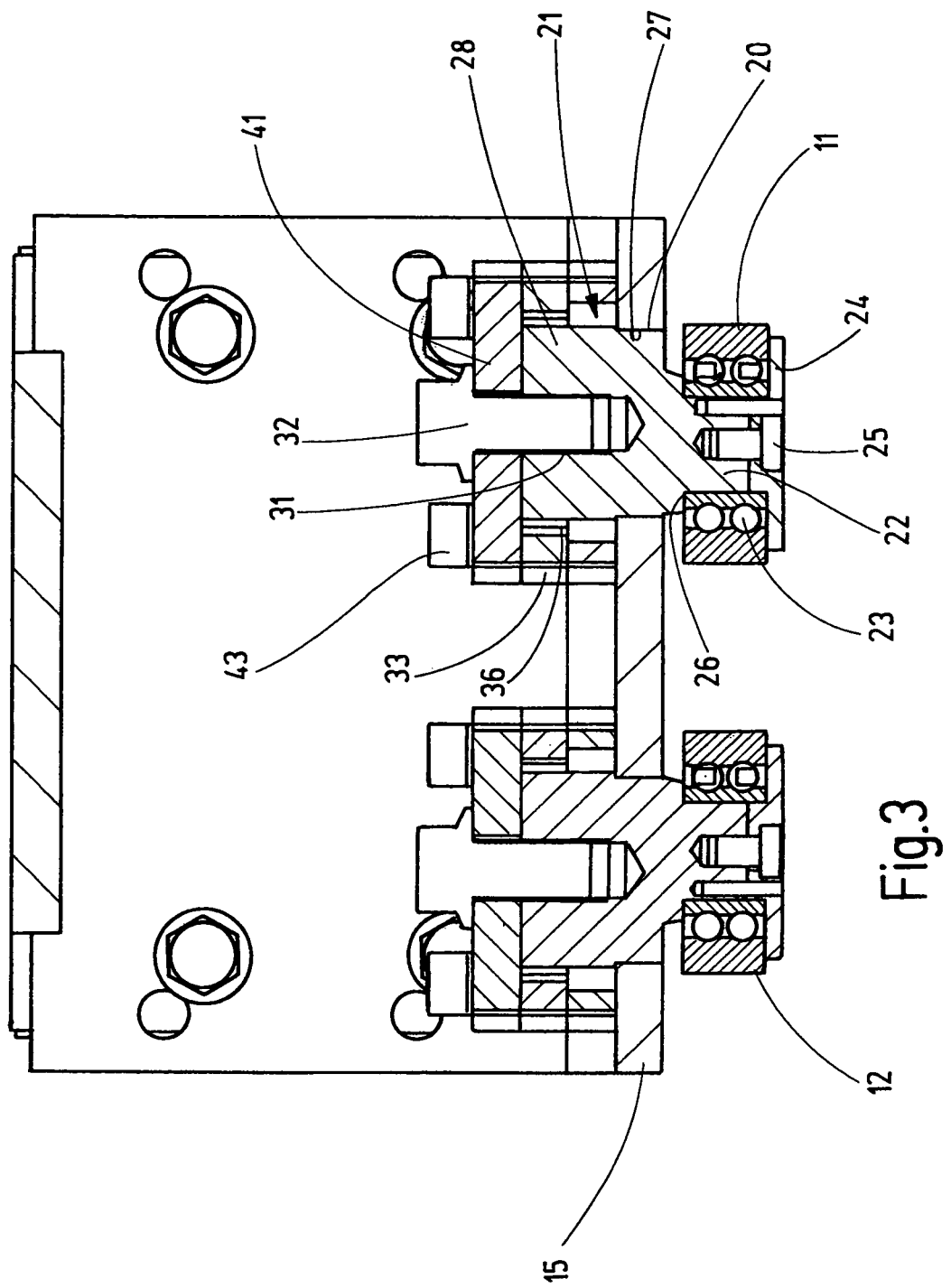
FIG. 3 is a vertical section of the crane head carrier shown in FIG. 2 taken through the axis of the guide rollers.

FIG. 3 depicts the manner in which the guide rollers 11,12 are seated and are adjustable with respect to their lateral play relative to the head of crane track rail 2. The type of bearing/mounting is identical for both guide rollers 11,12 so that it is sufficient to discuss the design in connection with one guide roller. The description applies accordingly to the other guide roller as well, for which reason identical reference numbers have been used.

For the guide roller 11, the carrier plate 15 has a through hole 20 in which an axle carrier 21 is seated. The receiving opening 20 is a cylindrical opening, the axis of which runs vertically and which has a sufficient lateral distance from the railhead.

The axle carrier is formed in one piece and has an axle journal 22, on which the annular guide roller 11 is rotatably seated with the aid of rolling-contact bearing elements 23. A cover 24 that is secured by means of a screw 25 that engages the axle journal 22 holds the guide roller 11 in place vertically.

The axle journal 22 terminates at a contact shoulder 26 that provides additional securement for the guide roller 11. Adjoining the axle journal, the axle carrier 21 transitions into a cylindrical section 27, the height of which corresponds to the thickness of the carrier plate 15, and the diameter of which is equal to the inside diameter of the receiving hole 20. In this manner the axle carrier 21 is accommodated in the receiving opening 20 rotatably and without radial play. As can be seen in FIG. 3, the axis of the cylindrical section 27 is parallel to the axis of the axle carrier 22, which in turn coincides with the axis of rotation of the guide roller 11.

Figure 4:
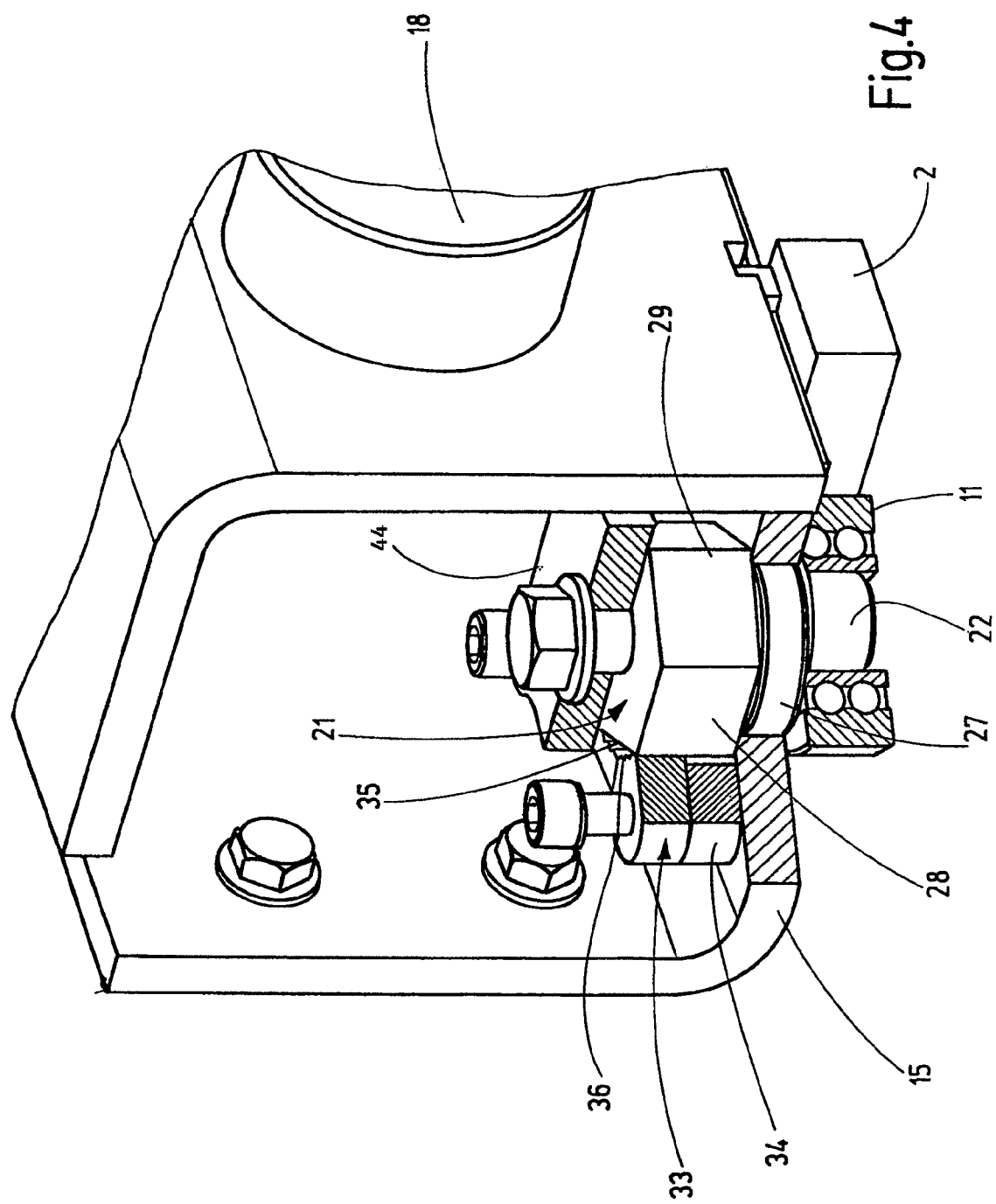
FIG. 4 is a perspective of the crane head carrier partially sectioned for purposes of illustration.

Above the cylindrical section 27, the axle carrier 21 transitions into a section 28 with a cross section corresponding to a regular polygon, a hexagon, which defines outside toothing 29, as seen in FIG. 4. Finally, a threaded hole 31 is provided in the upper end of the axle carrier 21 that receives a fixation screw 32 in order to absorb any tilting play. The axis of the threaded hole coincides with the axis of the outside toothing 29 and the axis of the cylindrical section 27. As can be seen in FIG. 4, the nominal width of the hexagon that forms the toothing 29 is somewhat larger than the diameter of the cylindrical section 27 so that the axle carrier 21 can rest from above on the flat carrier plate 15 alongside the hole.

In order to fix the axle carrier 21 in the desired position, a securing plate 33 is provided, which is held at a distance from the upper side of the carrier plate 15 with the aid of a spacer plate 34. The securing plate 33 has an opening 35 with inside teeth 36 formed therein.

In addition to the through opening 35 the securing plate 33 is formed with several groups of cylindrical fixation openings 37. The fixation openings 37 lie on a common circular line or segment.

Figure 5:
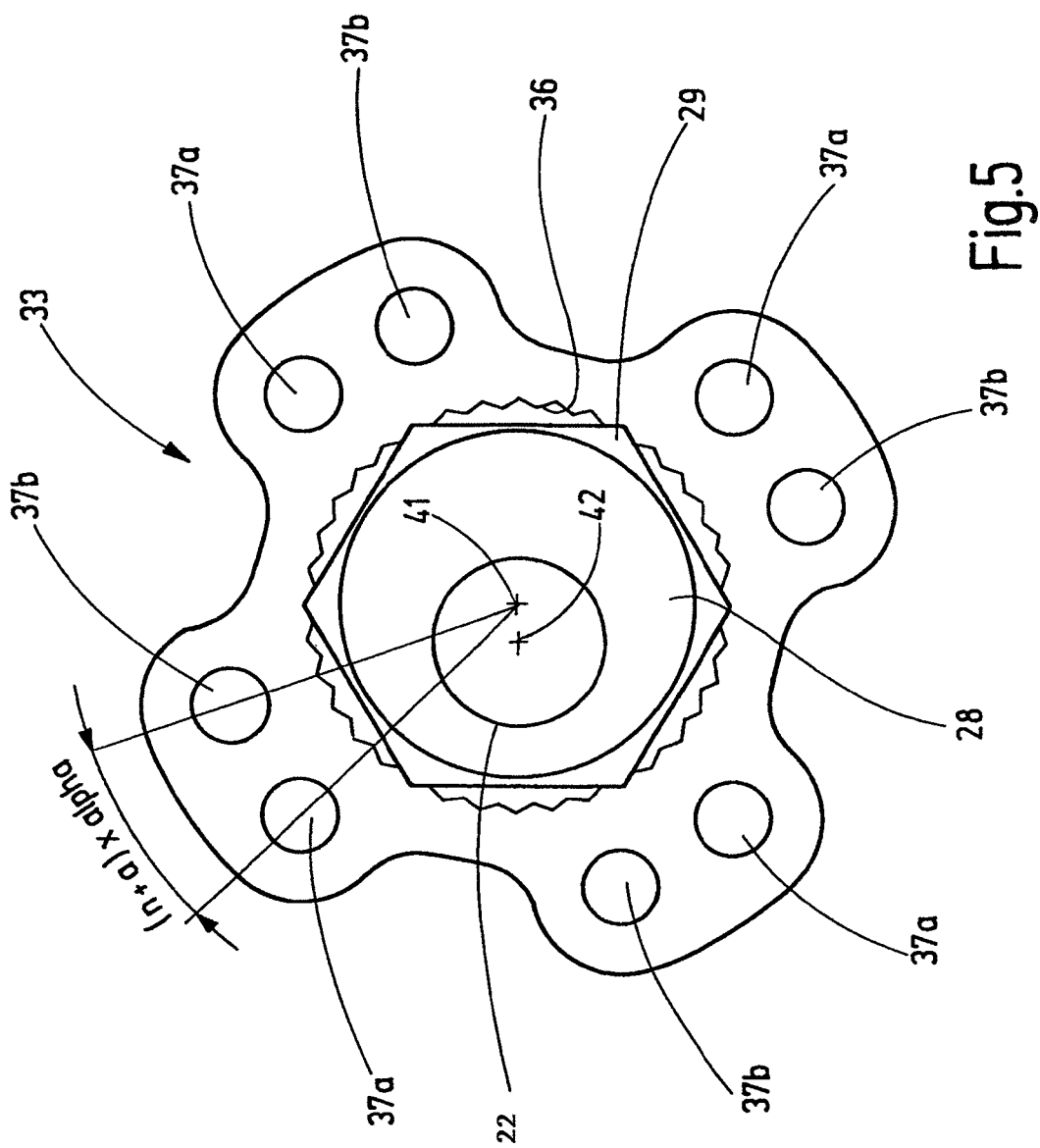
FIG. 5 is a plan view showing a securing plate with toothing relating to the axial carrier.

Of the total of 8 fixation openings 37, the fixation openings 37a lie on the corners of a common square. The fixation openings 37b likewise lie on the corners of their own square. The two squares produced in this way are in slightly rotated circumferential relation to each other. The axis of rotation about which the two squares are rotated relative to one another coincides with the axis of the outside toothing 29. The axis of the outside toothing 29, which extends perpendicular to the plane of the drawing of FIG. 5, is indicated with a cross 41. The axis of axle journal 22 also is indicated in FIG. 5 as a cross 42. Finally, FIG. 5 further shows the outer periphery of the axle journal 22 as a circle designated by reference number 22, because it symbolizes the outer peripheral surface of the axle journal 22.

The angle of rotation by which the two squares of fixation openings 37 are circumferentially rotated relative to each other is a multiple of the tooth pitch of the inside toothing 36 plus half the pitch angle between two adjacent teeth of the inside toothing 36. The fixation openings 37 serve to accommodate fixation bolts 43 that are bolted into corresponding appropriate threaded holes in the carrier plate 15, which are not visible in the figures. There are a total of four threaded holes distributed around the receiving opening 20; in particular, they lie on a circular line or segment that is concentric with the receiving hole 20 and they are 90° apart from one another in the circumferential direction.

The interposed spacer plate 34 corresponds in its exterior shape to the securing plate 33, with the exception that the inside toothing 36 is absent, and instead it has a smooth cylindrical hole with a diameter larger than the outside diameter of the tip circle of the outside toothing 29. Finally, a cover plate 44 lies on top of the stack consisting of the spacer plate 34 and the securing plate 33.

The described arrangement is used as follows:

During assembly, the axle carrier 21 is first inserted through the receiving opening 20 in the carrier plate 15. Then the guide roller 11 is pushed from below onto the axle journal 22 and secured via the bolt 25 with plate 24 interposed.

Since the hexagon 28, whose edges form the outside toothing 29, is larger at every point than the diameter of the receiving hole 20, the axle carrier 21 cannot fall through the receiving hole 20. Instead, it lies with the hexagon 28, on the upper side of the carrier plate 15. This measure is repeated with the two guide rollers 11, 12 of the carrier plate 15. The carrier plate 15 prepared in this way can be mounted on the end faces of the crane head carriers 7.

After the gantry crane is placed on the crane track rails 2, the longitudinal orientation of the crane head carriers 7 and the lateral guidance play of the railhead between the guide rollers 11, 12 is adjusted. For this purpose, a wrench can be placed on the hexagon 28 in order to turn the hexagon around the axle carrier 21 about its longitudinal axis. Because of its eccentric position with respect to the axis of rotation or the axis of the receiving hole, the axle journal 22 carries out a lateral movement with respect to the crane track rail 2. As soon as the correct position has been adjusted, the spacer plate 34 and finally the securing plate 33 are pushed on from the top. In this process, a position is sought for the securing plate 33 in which there is an optimally good alignment between the fixation openings 37 and the corresponding threaded holes in the carrier plate 15. The maximum error that can result is half as large as the pitch angle of the inside toothing 36 since, as already explained in detail, two sets of fixation openings 37 are present on the outer periphery of the securing plate 33 and are angularly offset from one another by an integer multiple plus one half of the pitch angle.

Once the most suitable insertion position has been reached, the axle carrier 21 is possibly rotated a slight amount until the final alignment between the fastening opening 37a or 37b and the threaded holes in the carrier plate 15 has been produced. With this rotation, the axle journal 22 moves a comparatively small distance with respect to the railhead. Finally the cover plate is put in position and the bolts 43 are driven in through the cover plate and tightened. Finally, the bolt 32 is driven in to fix the axle carrier 21 in the vertical direction.

Practical experience has shown that a favorable axial offset between the axes 41,42 is roughly 10 mm. This means that for a 36-vertex polygon as the inside toothing 36, a gradation of 1.8 mm per step is achieved in the worst case. This value is cut in half by using two sets of fixation openings 37a,37b which, as described above, have drilling patterns that are circumferentially rotated relative to one another.

Figure 6:
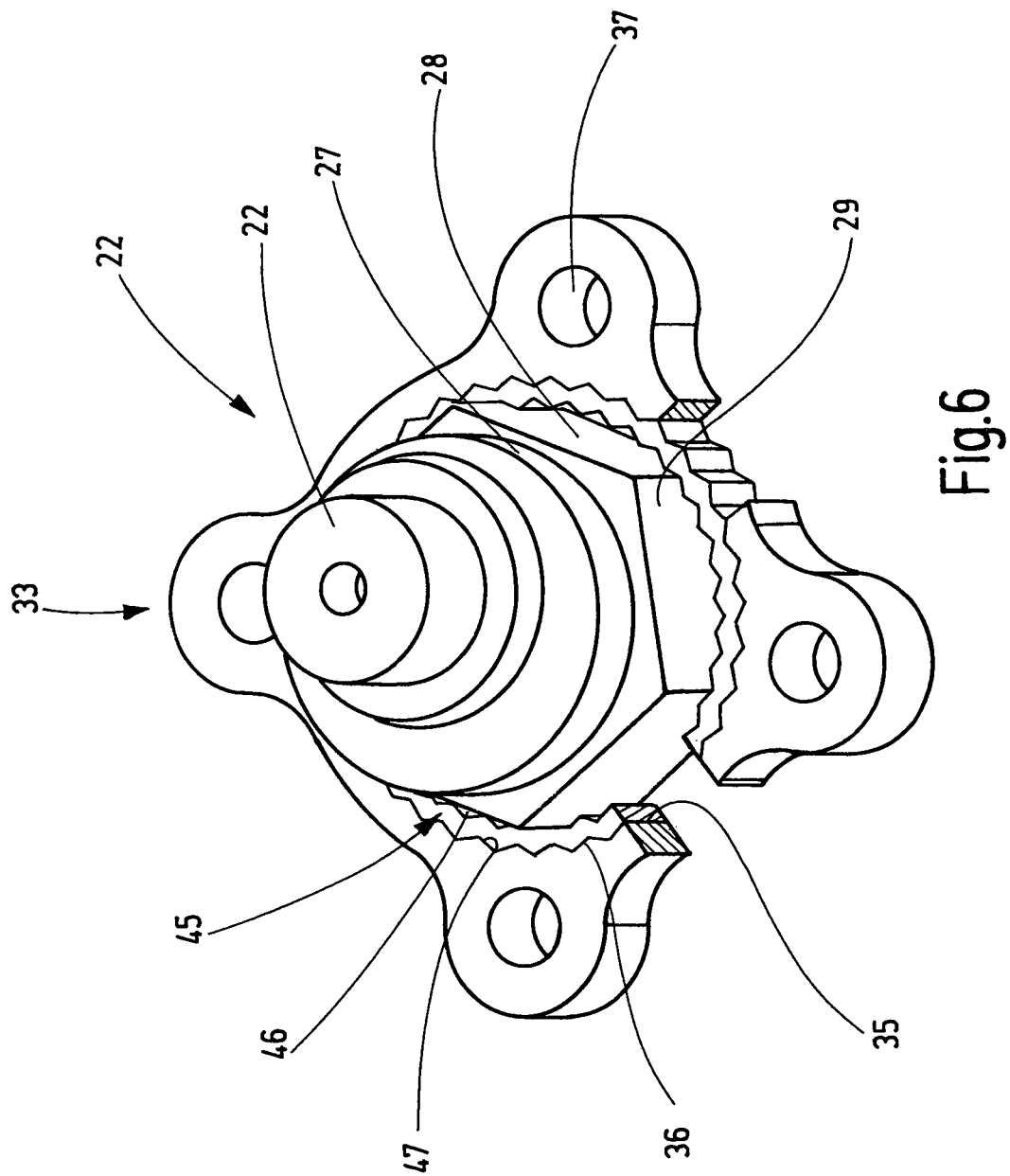
FIG. 6 is a perspective of an alternative embodiment of a guide roller positioning arrangement having an intermediate ring.

FIG. 6 shows an alternative embodiment for obtaining a very fine gradation. FIG. 6 shows, in a perspective representation, the axle carrier 21 with a view towards the axle journal 22, in connection with the securing plate 33, but the carrier plate 15 is omitted.

According to the embodiment in FIG. 6, the axle carrier 21 has the same shape as in the previously described embodiment. It again has in the axial direction of the axle journal 22, a cylindrical section 27 and a hexagon 28, the vertices of which represent the toothing 29. The securing plate 33 differs from the embodiment according to FIG. 5 by the use of only one set of fixation holes 37, i.e., in this example there are only four fixation holes 37, which lie on the vertices of a square, the center of which coincides with the center of the hexagon 28. In addition, the opening 35 with the toothing 36 is sufficiently large that an annular gap arises between the hexagon 28 and the inside toothing 36. An intermediate ring 45 that has inside toothing 46 and outside toothing 47 lies in the annular gap. The pitch and the characteristic values of the outside toothing 47 match those of the inside toothing 36. The inside toothing 46 in turn corresponds to the inside toothing 36 of the previous embodiment, so that the intermediate ring 45 interacts with the hexagon 28 exactly as was described in detail above. However, the number of inside teeth 36 corresponding to the outside teeth 47 and the number of inside teeth 46 are relatively prime. This results in a kind of vernier scale that makes it possible to design an even more precise calibration.

The assembly differs from the previously described assembly only in that, after the placement of the axle carrier 21, the securing ring 33 is immediately put in place. After the adjustment of the flank play between the guide rollers 11,12 and the head of the crane track rail 2, the position is sought in which the toothing of the intermediate ring 45 fits in the annular gap between the outside toothing 29 and inside toothing 36.

In the illustrated embodiment, it was assumed that the sets of teeth that are engaged with one another are arranged outside the carrier plate. This facilitates the assembly in a certain sense. It is possible, however, to shift the inside toothing 36 into the receiving hole 20. The mode of operation is then fundamentally the same; only the adjustment is somewhat different because the axle carrier must be inserted with the correct angle of rotation into the toothed receiving hole. The securing plate with the inside toothing can then be omitted.

From the foregoing, it can be seen that the invention allows not only the compensation for tolerances but also an adaptation to rail heads of different widths. The roller arrangement for gantry cranes provides two rotatably seated axle carriers on which the guide rollers are seated. The guide rollers are arranged on axle journals that are arranged eccentrically in the carrier plate with respect to the axis of rotation of the axle carrier. The selected eccentric position of the axle journal can be fixed with a positive-fit connection with the aid of toothing on the axle journal and the carrier plate.

The invention claimed is:

1. A crane head carrier (7) for running on a crane rail (2) comprising:
   running wheels (10) for running along sides of the crane rails (2),
   a guide roller arrangement for the crane head carrier (7), said guide roller arrangement including a carrier plate (15) having at least one circular receiving opening (20) with a longitudinal axis (41) of which extends alongside a crane rail (2),
   an axle carrier (21) seated in said receiving opening (20),
   a guide roller (11, 12) rotatably mounted on said axle carrier (21), said axle carrier (21) having an exterior outside toothing (29) formed a number of teeth about a circle an axial distance away from the guide roller (11, 12), said guide roller (11, 12) having a rotary axis (42) in parallel laterally offset relation to a center axis (41) of the circle along which the outside toothing (29) extends, said carrier plate (15) having an inside toothing (36) with a number of teeth that is an integer multiple of the number of teeth of said outside toothing (29) on the axle carrier (21), said inside toothing (36) defining an inner most root circle diameter and said outside toothing (29) defining an outer most tip circle diameter, and said root circle diameter of said inside toothing (36) coinciding with the tip circle diameter of said outside toothing (29).

2. The crane head carrier of claim 1 in which said carrier plate (15) has two of said receiving openings (20) with respective axes (41) on opposite sides of a crane rail (2).

3. The crane head carrier of claim 1 in which said carrier plate (15) is angled and has a mounting surface (16) for the axle carrier (21).

4. The crane head carrier of claim 1 in which said axle carrier (21) has an axle journal (22) on which the guide roller (11, 12) is mounted.

5. The crane head carrier of claim 4 in which said guide roller (11, 12) is seated on rolling-contact elements (23) of said axle journal (22).

6. The crane head carrier of claim 1 in which said axle carrier (21) has a longitudinal section (27) with a diameter that conforms to the diameter of the receiving opening (20).

7. The crane head carrier of claim 4 in which axle carrier (21) has a cylindrical section (27) within said receiving opening (20), and said outside toothing (29) extends over the length of the axle carrier (21) except for said cylindrical section (27) and axle journal (22).

8. The crane head carrier of claim 1 in which said outside toothing (29) is formed by the vertices of a hexagon or an octagon configuration of said axle carrier (21).

9. The crane head carrier of claim 1 in which said offset between the axis (42) of the guide roller (22) and the axis (41) of the circle along which the outside toothing extends between 3 mm and 25 mm.

10. The crane head carrier of claim 1 in which a number of teeth of the inside toothing (36, 46) that engage the outside toothing (29) is larger than the number of teeth of the outside toothing (29) by an integer multiple of the number of teeth of said outside toothing (29) between 2 and 20.

11. The crane head carrier of claim 1, in which the axle carrier (21) has a coaxial threaded hole (31).

12. A crane head carrier (7) for running on a crane rail (2) comprising:
    running wheels (10) for running along sides of crane rails (2),
    a guide roller arrangement for the crane head carrier (7), said guide roller arrangement including a carrier plate (15) having at least one circular receiving opening (20) with a longitudinal axis (41) of which extends alongside a crane rail (2),
    an axle carrier (21) seated in said receiving opening (20),
    a guide roller (11, 12) rotatably mounted on said axle carrier (21), said axle carrier (21) having an exterior outside toothing (29) formed a number of teeth about a circle an axial distance away from the guide roller (11, 12), said guide roller (11, 12) having a rotary axis (42) in parallel laterally offset relation to a center axis (41) of the circle along which the outside toothing (29) extends,
    a securing plate (33) supported by said carrier plate (15) having an inside toothing (36) with a number of teeth that is an integer multiple of the number of teeth of said outside toothing (29) on the axle carrier (21), said inside toothing (36) defining an inner most root circle diameter and said outside toothing (29) defining an outer most tip circle diameter, and said root circle diameter of said inside toothing (36) coinciding with the tip circle diameter of said outside toothing (29),
    said carrier plate (15) having at least one fixation opening provided alongside said receiving opening (20), and
    said securing plate (33) having a fixation opening that is aligned in an assembled state with the fixation opening in the carrier plate (15).

13. The crane head carrier of claim 12, in which the securing plate (33) includes at least two fixation openings (37a, 37b) that are offset with respect to one another along a circumferential angle relative to the axis (41) of the inside toothing (36) by an angle that is an integer multiple of the angle between two adjacent teeth of the inside toothing (36) plus half the angle between adjacent teeth of the inside toothing (36).

14. The crane head carrier of claim 12, including a spacer plate inserted between the securing plate (33) and the carrier plate (15).

15. The crane head carrier of claim 12, including a cover plate having a hole on a side of the securing plate (33) remote from the guide roller (11, 12).

16. The crane head carrier of claim 12, in which said fixation opening is a threaded hole.

17. The crane head carrier of claim 12, in which the tip circle diameter of the outside toothing (29) on the axle carrier (21) is larger than the diameter of the receiving hole (20).

18. A crane head carrier (7) for running on a crane rail (2) comprising:
    running wheels (10) for running along sides of crane rails (2),
    a guide roller arrangement for the crane head carrier (7), said guide roller arrangement including a carrier plate (15) having at least one receiving opening (20) with a longitudinal axis (41) of which extends alongside a crane rail (2),
    an axle carrier (21) seated in said receiving opening (20),
    a guide roller (11, 12) rotatably mounted on said axle carrier (21), said axle carrier (21) having an exterior outside toothing (29) formed a number of teeth about a circle an axial distance away from the guide roller (11, 12), said guide roller (11, 12) having a rotary axis (42) in parallel laterally offset relation to a center axis (41) of the circle along which the outside toothing (29) extends, said carrier plate (15) having an inside toothing (36) with teeth which define an inner most tip circle diameter, said outside toothing (29) of said axial carrier having teeth which define an outer most tip circle diameter, said tip circle diameter of said inside toothing (36) being larger than the tip circle diameter of said outside toothing (29) for forming an annular gap therebetween, an intermediate ring (45) disposed in said annular gap and having inside and outside toothing (46, 47) each defined by a number of teeth, the number of teeth on the inside toothing (46) of the intermediate ring (45) differing from the number of teeth of the outside toothing (47) of the intermediate ring (45) by at least one tooth, and the number of teeth of the inside toothing (46) of the intermediate ring (45) being an integer multiple of the number of the teeth outside toothing (29) of the axle carrier (21).

19. The crane head carrier of claim 18 in which said inside toothing (36) is defined by a securing plate (33) on said carrier plate (15), and a carrier plate (15) has at least one fixation opening (37) that is provided alongside the receiving opening (20), and said securing plate (33) includes a fixation opening (37) that is aligned in an assembled state with the fixation opening in the carrier plate (15).

\* \* \* \* \*

UNITED STATES PATENT AND TRADEMARK OFFICE
CERTIFICATE OF CORRECTION

| | | |
|---|---|---|
| PATENT NO. | : 8,448,578 B2 | Page 1 of 1 |
| APPLICATION NO. | : 12/742592 | |
| DATED | : May 28, 2013 | |
| INVENTOR(S) | : Markus Golder | |

It is certified that error appears in the above-identified patent and that said Letters Patent is hereby corrected as shown below:

In the Claims:

In column 7, line 15, claim 1 of the patent, "running wheels (10) for running along sides of the crane rails (2)," should be corrected to read -- running wheels (10) for running along sides of crane rails (2), --.

Signed and Sealed this
Ninth Day of July, 2013

Teresa Stanek Rea
*Acting Director of the United States Patent and Trademark Office*